(12) United States Patent
Salani et al.

(10) Patent No.: US 11,000,788 B2
(45) Date of Patent: May 11, 2021

(54) MULTIPURPOSE DISPOSABLE FILTERING FUNNEL

(71) Applicant: S&S CONCEPTS, Elk Grove Village, IL (US)

(72) Inventors: Theodore Salani, Woodridge, IL (US); Robert Salani, Niles, IL (US)

(73) Assignee: S&S CONCEPTS, Elk Grove Village, IL (US)

( * ) Notice: Subject to any disclaimer, the term of this patent is extended or adjusted under 35 U.S.C. 154(b) by 0 days.

(21) Appl. No.: 15/557,422

(22) PCT Filed: Feb. 18, 2016

(86) PCT No.: PCT/US2016/018485
§ 371 (c)(1),
(2) Date: Sep. 11, 2017

(87) PCT Pub. No.: WO2016/134155
PCT Pub. Date: Aug. 25, 2016

(65) Prior Publication Data
US 2018/0078882 A1    Mar. 22, 2018

Related U.S. Application Data

(60) Provisional application No. 62/118,388, filed on Feb. 19, 2015.

(51) Int. Cl.
*B01D 29/085* (2006.01)
*B67C 11/02* (2006.01)

(52) U.S. Cl.
CPC .......... *B01D 29/085* (2013.01); *B67C 11/02* (2013.01); *B01D 2201/24* (2013.01)

(58) Field of Classification Search
CPC ... B01D 29/085; B01D 2201/24; B67C 11/02; A47J 31/06; A01J 11/06; B01L 2300/0681; G01N 2001/4088
See application file for complete search history.

(56) References Cited

U.S. PATENT DOCUMENTS 2,896,788 A * 7/1959 Hoffberger ............... A47J 43/22
                                                                210/473
2,994,931 A * 8/1961 Operhall ................... B22C 7/02
                                                                164/246
(Continued)

FOREIGN PATENT DOCUMENTS

FR        589214 A  *  5/1925  ........... B01D 29/085
GB        494316 A  * 10/1938  ........... B01D 29/085

OTHER PUBLICATIONS

International Search Report and Written Opinion for International Application No. PCT/US2016/018485, dated May 17, 2016.
(Continued)

*Primary Examiner* — Waqaas Ali
(74) *Attorney, Agent, or Firm* — Marshall, Gerstein & Borun LLP (57) ABSTRACT

A filtering funnel assembly has an outer body having a plurality of panels. A first one of the panels is joinable to a second one of the panels to define a funnel. Each of the plurality of panels including a top edge and a bottom edge, the top edges define a funnel inlet and the bottom edges define a funnel outlet. A liner is nestable within the funnel, the liner has a top portion forming an opening and a bottom portion. A portion of the liner is configured to attach to a portion of the funnel. The liner nested within the outer body enables a fluid to enter the fluid inlet of the funnel and the fluid inlet of the filter liner and to pass through the bottom portion of the filter liner and the fluid outlet of the funnel.

16 Claims, 8 Drawing Sheets

(56) References Cited

U.S. PATENT DOCUMENTS

| | | | |
|---|---|---|---|
| 5,104,538 | A | 4/1992 | Verreau |
| 7,237,583 | B2 | 7/2007 | Salani et al. |
| 7,240,701 | B2 | 7/2007 | Salani et al. |
| 7,383,863 | B2 | 6/2008 | Salani et al. |
| 2004/0222147 | A1* | 11/2004 | Post .................. A47J 31/02 210/493.1 |
| 2006/0021674 | A1* | 2/2006 | Salani .................. B65D 25/48 141/337 |

OTHER PUBLICATIONS

International Preliminary Report on Patentability for PCT/US2016/018485, dated Aug. 22, 2017.

* cited by examiner

MULTIPURPOSE DISPOSABLE FILTERING FUNNEL

FIELD OF INVENTION

The present invention relates to a disposable filtering funnel.

BACKGROUND OF THE INVENTION

Existing funnels typically have a small area of filter media through which the liquid must pass. As the filter media collects particulate contamination, the flow rate slows further. After use, the filter media needs to be cleaned or replaced prior to reusing.

SUMMARY OF THE INVENTION

The present invention relates to a disposable funnel that is configured to incorporate a filtration media thereby providing a mechanism for filtering particulate contamination from fluids transmitted through the funnel. In accordance with an important aspect of the invention, the body of the funnel is made from material, customarily paper, which lends itself to being considered disposable as a consequence of its economic and environmental advantages. Furthermore, the body of the funnel as a result of the design and material of manufacture has the advantage of being formed to fold flat for storage and unfold into an open configuration for use. The filtration media is flexible and is incorporated into the body of the funnel so as to form to the body in both a closed and open configuration.

In accordance with one or more aspects, a filtering funnel assembly and funnel insert in accordance with the teachings described herein may address a need for a portable, clean, economical and disposable filtering funnel.

In accordance with an exemplary aspect, a filtering funnel assembly may include an outer body having a plurality of panels, where a first one of the panels is joinable to a second one of the panels to define a funnel. Each of the plurality of panels may include a top edge and a bottom edge, wherein the top edges may define a funnel inlet and the bottom edges define a funnel outlet. The filtering funnel assembly may include a liner nestable within the funnel, where the liner may include a top portion forming an opening and a bottom portion. At least a first portion of the liner may include a filter media.

In accordance with a second exemplary aspect, a filtering funnel assembly may include a funnel-shaped outer body, wherein the outer body has a top edge and a bottom edge. The top edge may define a funnel inlet and the bottom edge may define a funnel outlet. The filtering funnel may further include a liner nestable within the outer body, wherein the the liner may a top portion forming an opening and a bottom portion. At least a first portion of the liner may include a filter media In accordance with an exemplary aspect, a funnel insert may include a plurality of panels where a first one of the panels is joinable to a second one of the panels to define an interior volume. Each of the plurality of panels may include a top edge and a bottom portion, wherein the top edges define an inlet of the interior volume and the bottom portions define an end. A first portion may include a porous material and a second portion including a nonporous material. The interior volume may be configured to allow a fluid to enter the inlet and to pass through the first portion.

In further accordance with any one or more of the foregoing exemplary aspects, a filtering funnel assembly/funnel insert may include any one or more of the following preferred forms. In a preferred form, the liner of the filtering funnel assembly may further include a plurality of panels, a first one of the panels joinable to a second one of the panels to define an interior space in communication with the funnel inlet.

In a preferred form of the filtering funnel assembly, the funnel may have a first height and the liner may have a second height, wherein the first height is greater than the second height.

In a preferred form of the filtering funnel assembly, the plurality of panels of the outer body may be defined by fold lines.

In a preferred form of the filtering funnel assembly, a volume of the funnel may be larger than a volume of the interior space of the liner.

In a preferred form of the filtering funnel assembly, a portion of the liner may be attachable to a portion of the outer body.

In a preferred form of the filtering funnel assembly, the top portion of the liner may be attachable adjacent to the top edges of the outer body.

In a preferred form of the filtering funnel assembly, the liner may be bonded to the outer body.

In a preferred form of the filtering funnel assembly, the filter media is at least one of (a)-(e): (a) a polymer mesh, (b) a metallic mesh, (c) a nylon mesh, (d) a paper mesh, and (e) a fabric mesh.

In a preferred form of the filtering funnel assembly, the outer body may include card stock.

In a preferred form of the filtering funnel assembly, a second portion of the liner may include a nonporous material.

In a preferred form of the filtering funnel assembly, the number of panels of the outer body may be different than a number of panels of the liner.

In a preferred form, the filtering funnel assembly may include a gap between the bottom portion of the liner and the funnel outlet.

In a preferred form of the filtering funnel assembly, the first portion is disposed at the end.

In a preferred form of the insert, the interior volume may taper from the inlet to the end.

In a preferred form of the insert, at least one of the panels may include an aperture positioned above the end, and wherein a reservoir may be formed between the end and the aperture.

In a preferred form of the insert, the first portion may be disposed at the end.

In a preferred form of the insert, the second portion may be disposed at the top edges.

In a preferred form of the insert, the first portion may be disposed at the top edges, and the second portion may be disposed at the end.

DETAILED DESCRIPTION

Figure 1:
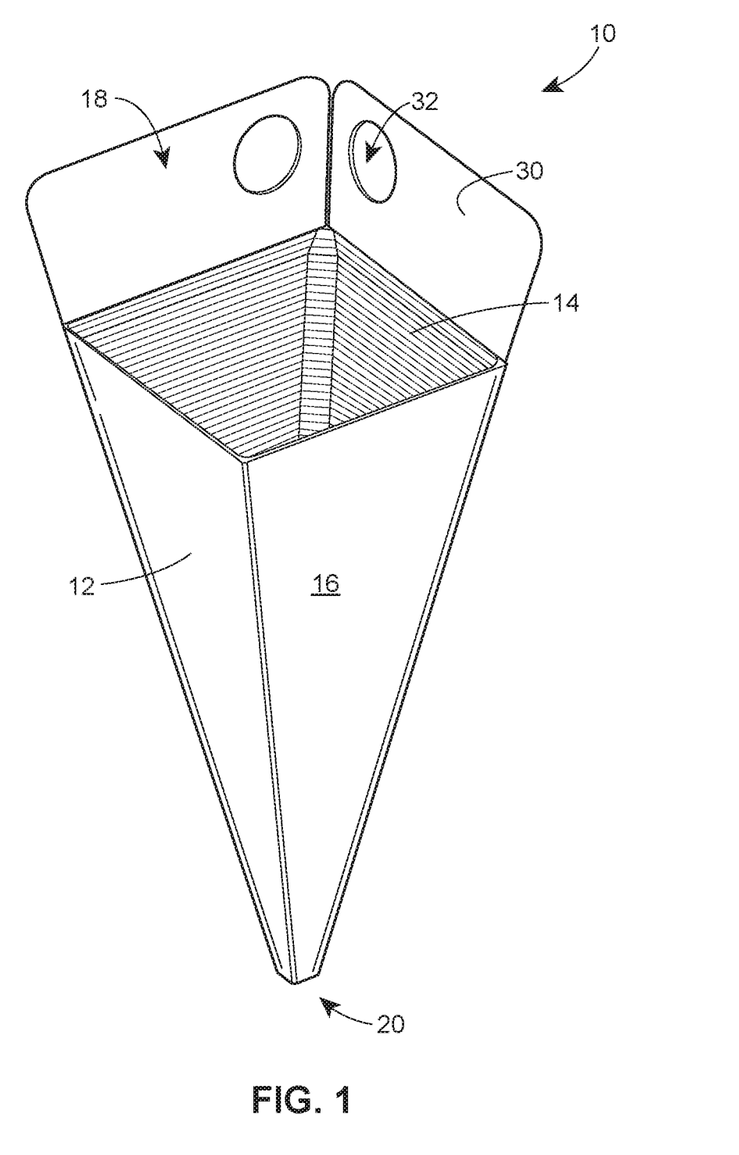
FIG. 1 is a perspective view of a first exemplary filtering funnel assembly in accordance with the teachings of the present disclosure.

A disposable filtering funnel assembly 10, which incorporates a filtration media, provides a mechanism for filtering particulate contamination from fluids and is illustrated in FIG. 1. The filtering funnel assembly 10 includes an outer body 12 and a liner 14 that is nestable within the outer body 12. The outer body 12 has a plurality of panels 16, a first one of the panels is joinable to a second one of the panels to define a funnel. The funnel has an inlet 18 and an outlet 20. In the illustrated example of FIG. 1, the outer body 12 includes four panels 16 forming a funnel having a square cross-section. At least a portion of the liner 14 may be made of a porous material, such as a filter media, which filters fluid as it enters the filtering funnel assembly 10.

The filtering funnel assembly 10 may be manufactured as a pre-assembled filtering funnel or as separate parts configured to be assembled and combined to form the filtering funnel assembly 10. Each of the outer body 12 and the liner 14, as described and illustrated herein, may be assembled from a blank or collapsed configuration to an expanded configuration for use.

Figure 2:
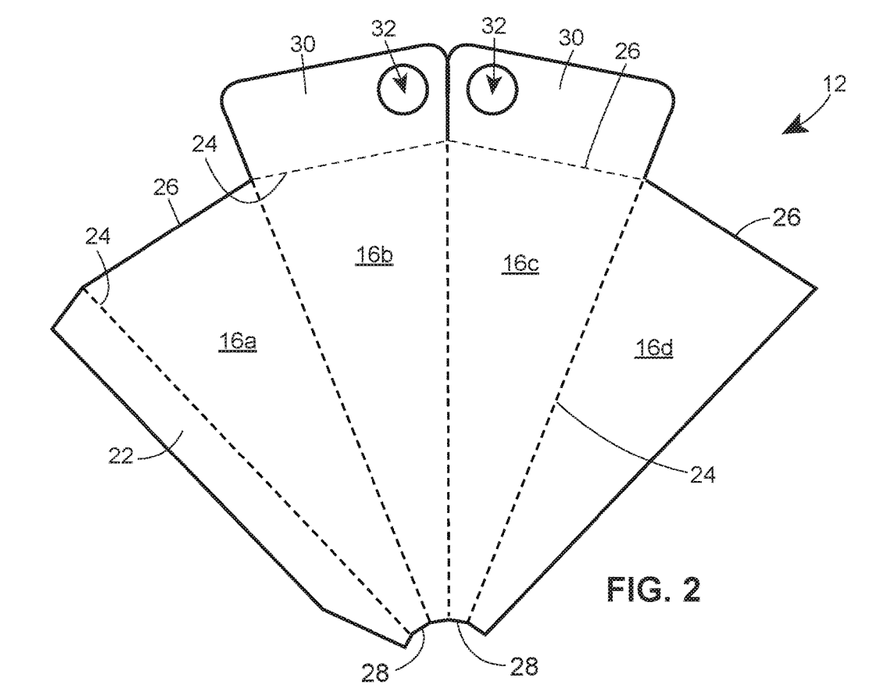
FIG. 2 is an outer body blank in a blank configuration in accordance with the teachings of the present disclosure.

In FIG. 2, the outer body 12 is illustrated in a blank configuration. The outer body 12 includes panels 16a, 16b, 16c, 16d and a seam 22 adjacent to one of the panels 16a. The panels 16 and the seam 22 are defined or separated by fold lines 24. The seam 22 is configured, as explained further below, to bond or otherwise secure to an outer panel 16d. Each panel 16 includes a top edge 26 and a bottom edge 28, wherein the top edge 26 is wider than the bottom edge 28. Each of inner panels 16b, 16c includes a tab 30 with a round aperture 32. The inner panels 16b, 16c may have fold lines separating the top edges 26 of the panels 16b, 16c from the tabs 30. The round apertures 32 formed in the tabs 30 are disposed such that an operator may hold the funnel with fingers.

For purposes of compact design and cleanliness, the outer body 12 may be easily foldable along fold lines 24 to form the expanded configuration. Illustrated in FIG. 3, the outer body 12 is in the folded or collapsed configuration where the panels 16 and the seam 22 are folded along the fold lines 24. The seam 22 attaches to the outer panel 16d may be folded flat. An adhesive may be disposed on an inner surface or an outer surface of the seam 22 such that it bonds to an outer surface or an inner surface, respectively, of the outer panel 16d. As shown in the collapsed configuration of the outer body 12 in FIG. 3, an outer surface of the seam 22 adheres to an inner surface of the outer panel 16d. After the seam 22 is secured to the outer panel 16d, the outer body 12 may open from the flat configuration into a funnel by pulling the sides of the folded outer body 12 apart.

Figure 4:
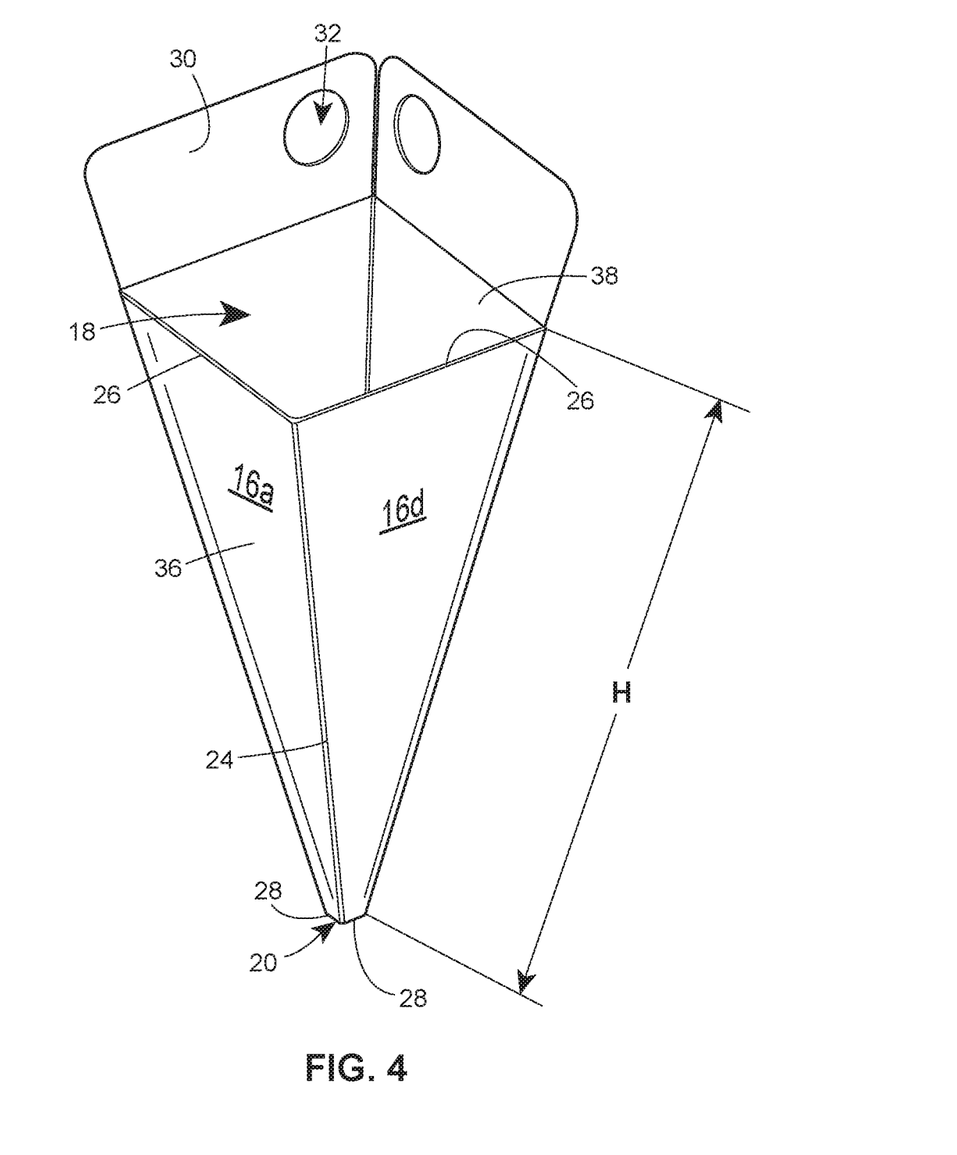
FIG. 4 is a perspective view of the outer body of FIG. 2 in an expanded configuration and as shown in FIG. 1.

In the expanded configuration of FIG. 4, the panels 16 of the outer body 12 form a funnel having a funnel inlet 18 and a funnel outlet 20. The top edges 26 of each panel 16 define the generally square cross-sectional funnel inlet 18 and the bottom edges 28 form a generally square cross-sectional funnel outlet 20. The height H of a panel is defined by the distance between a top edge 26 of one of the panels 16 and the bottom edge 28 of the same panel 16. The outer body 12 has an exterior surface 36 and an interior surface 38 to which the liner 14 may be attached.

In a preferred embodiment of the outer body 12, the panels are uniform and generally taper from the top edge 26 to a bottom edge 28. As illustrated in the FIGS. 1-4, the panels 16 are trapezoidal, but may be another shape. The outer body 12 may be fabricated without tabs 30, with a handle, a loop, or other gripping device. While the illustrated example includes four panels 16, other embodiments of the outer body 12 may include one panel having a circular cross-section or more panels having a polygonal cross-section. In the case of one panel, the outer body may form a conical shape where a top edge forms a funnel inlet and a bottom edge forms the funnel outlet.

Figure 3:
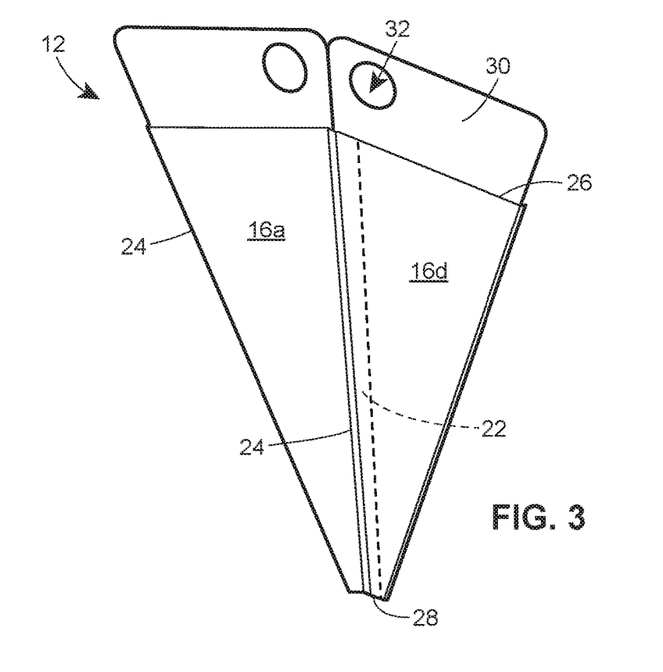
FIG. 3 is a perspective view of the outer body of FIG. 2 in a folded or collapsed configuration.

The disposable funnel is relatively simple and inexpensive and in one embodiment is formed from paper card stock such as 10 pt. SBS. Furthermore, the outer body 12 may be made of a heavy-duty carton style polycoated paper stock. This material is defined as having a thin polymer film bonded to one or more sides of the paper stock. Paper of this type is typically suited for liquid handling, and at least the inner surface 38 of the outer body 12 is polycoated. The outer body 12 may be manufactured as a flat funnel blank as illustrated in FIG. 2, or in the collapsed configuration as illustrated in FIG. 3. The outer body 12 may be stored in the collapsed configuration or in the blank configuration. The outer body 12 is preferably polycoated paper, but may be any suitable material, such as a polymer or flexible metal. Additionally, the outer body 12 may be made of recyclable or reusable materials.

Figure 5:
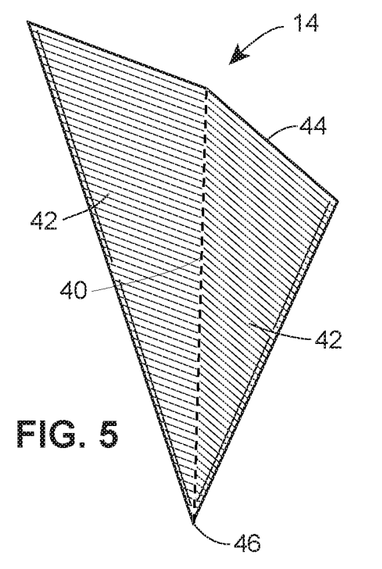
FIG. 5 is a perspective view of a first exemplary liner in a folded configuration in accordance with the teachings of the present disclosure.
Figure 6:
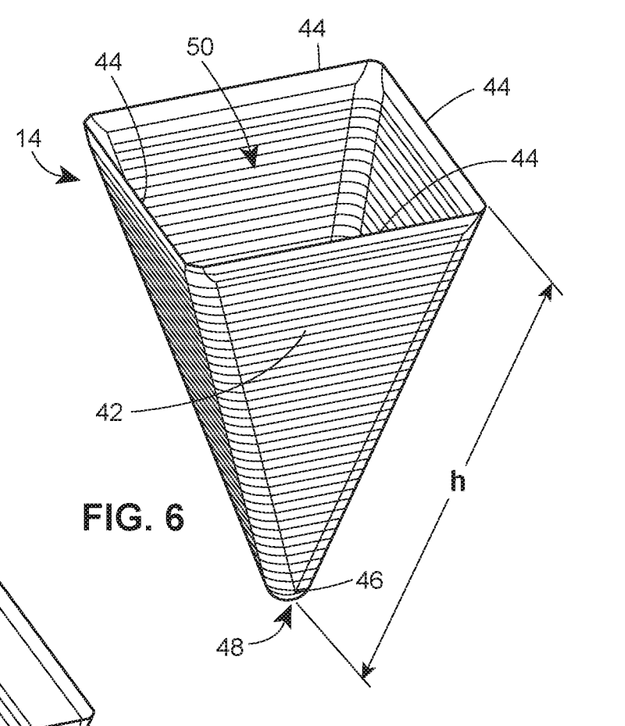
FIG. 6 is a perspective view of the liner of FIG. 5 in an expanded configuration.

Turning now to FIG. 5, a filter liner 14 or insert from FIG. 1 is illustrated in a collapsed configuration. The liner 14 may have a fold lines 40 that define a plurality of panels 42. A first one of the panels 42 is joinable to a second one of the panels to form a folded and generally triangular shaped liner 14. Each panel 42 has a top edge 44 and a bottom portion 46. In FIG. 6, each of the top edges 44 of the panels 42 define an opening 50 of an interior space, and each bottom portion 46 is connected to the other portions 46 of the panels 42 to form a closed end 48 as shown in FIG. 6. As most clearly illustrated in the expanded configuration of FIG. 6, the panels 42 of the liner 14 expand to form an interior space or volume having a generally square cross-sectional opening 50. The height h of the liner 14 is defined by the distance between the top edge 44 of one panel 42 and a bottom portion 46 of the same panel 42.

In a preferred embodiment, the liner 14 is made of a filter media, such as a polymer mesh material of filter grade pattern, typically 5 to 150 micron. The liner 14 may have a seamed edge, which is similar to the seam 22 of the outer body 12, and would typically be closed by a heat sealing procedure thus forming a closed pouch, or the interior space, with only one opening.

A fluid poured into said liner 14 would ultimately pass through the fine mesh pores while filtering out any contaminants larger than the mesh pores. The liner 14 may be flexible to form to a desired shape or to the shape of the funnel of the outer body 12. The filter media may be a polymer mesh, a metallic mesh, a nylon mesh, a paper mesh, and a fabric mesh.

Figure 7:
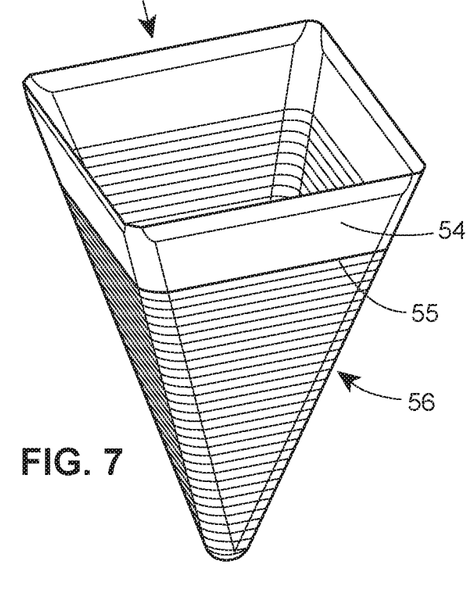
FIG. 7 is a perspective view of second exemplary liner in an expanded configuration in accordance with the teachings of the present disclosure.

A second exemplary filter liner or insert 52 is illustrated in FIG. 7. The filter liner 52 includes at least two different materials: a porous material, as described above, and a nonporous material. In the illustrated example of FIG. 7, a upper portion 54 of the liner 52 may be a nonporous material, such as a polymer or other suitable material, that is adapted to adhere or otherwise attach to the outer body 12. A lower portion 56 of the liner 52 is a porous filter media material. The transition between portions of porous and nonporous material, hereby called the joint 55, would be perpendicular to the longitudinal plane and would divide the insert or liner 52 into the upper and lower portions. The porous portion would function as a filter for capturing solid particulate. The nonporous surface would block and/or contain the medium. The upper and lower portions may be of equal or unequal surface areas. In another embodiment, the liner is divided into right and left halves wherein each half is one of the porous material and nonporous materials. The porous and non-porous portions form symmetrical right and left halves with joints parallel to the taper of the insert.

This embodiment may enhance manufacturability, reduce fabrication costs, or be used to capture water or other liquid contaminants by virtue of containment of those compounds. This configuration may utilize a bonding method (i.e. ultrasonic welding) to join the dissimilar surfaces or may be a homogenous material fabricated to accomplish the desired effect. In another embodiment, the upper portion may be a porous material and the lower portion may be a nonporous material for filtering certain fluids, such as water separation in lubrication maintenance, as described below and with reference to FIGS. 9-11.

Figure 8:
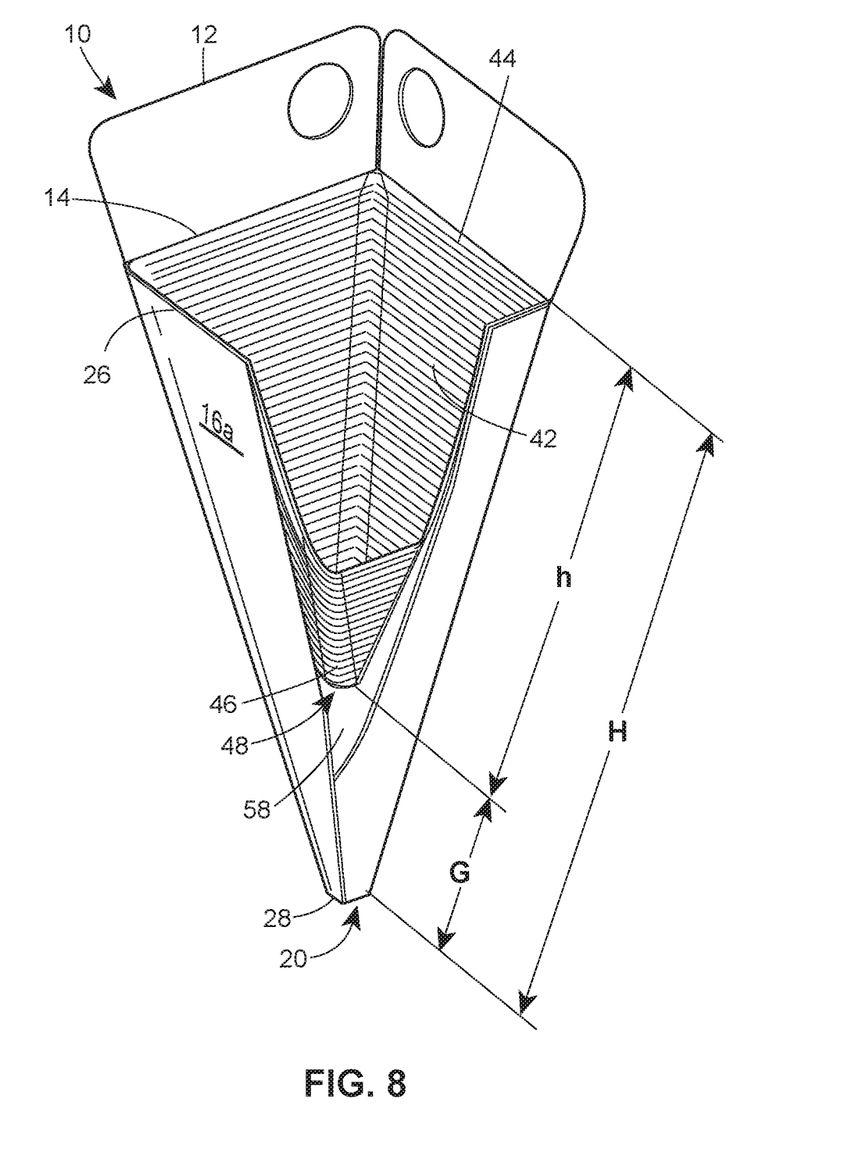
FIG. 8 is a partial view of the filtering funnel assembly of FIG. 1 with the outer body of FIG. 4 and the liner of FIG. 6.

The filtering funnel assembly 10 of FIG. 8 includes the liner 14 disposed within the enclosed funnel of the outer body 12. A portion of the liner 14 may be bonded to a portion of the outer body 12. For example, the top edges 44 of the liner 14 may attach to the outer body 12 at or near the top edges 26 of the outer body 12. The liner 14 may be attached to an interior surface of the outer body 12 or may be at least partially folded over the top edges 26 of the outer body 12 so that the liner 14 remains in place during use.

As illustrated in FIG. 8, a compartment 58 is formed between an interior surface of the outer body 12 and an exterior surface of the liner 14. This compartment 58 provides space for fluid to pass through the panels 42 of the liner 14 of the filtering funnel assembly 10 and through the outlet 20 of the outer body 12. A gap G is shown as the distance between the closed bottom 48 of the liner 14 and the outlet 20 of the filtering funnel assembly 10. Gap G is the difference between the height H of the outer body 12 and the height h of the liner 14. The compartment 58 formed between the liner 14 and the outer body 12 allows a large surface area of the liner 14 to filter fluid. Rather than simply filter fluid through the bottom portion 48 of the liner 14, fluid may pass through the porous material at any point of the liner 14 where the outer body 12 is spaced away from the liner 14. In a preferred embodiment, the outer body 12 includes the same number of panels 16 as the liner 14. In other embodiments, a number of panels 16 of the outer body 12 may be different than a number of panels 42 of the liner 14.

The outer body 12, providing a defined and rigid shape and outlet 20, forms the structure and allows for ease of handling and direction of flow for the filtered liquid. The filter liner 14 is bonded, or otherwise suitably secured, to the outer body 12 by any suitable method, such as, for example, glue or other adhesives, mechanical fastening, RF welding, or heat sealing. Still other methods may prove suitable. In one particular example, the liner 14 and outer body 12 are bonded together by means of a heat sealed seam created at the top edge 44 of liner 14 and funnel of a typical width of 1/16" to 1/4" and extending around the circumference of both bodies. This seam is created during the heat sealing process the melting together and cooling of the polymer liner and the polycoated surface of the funnel paper.

A key advantage of this design is the large surface area of the filter media forming the liner. The present invention would allow liquid to pass through a much larger area thus increasing the rate of filtration. This would be a key benefit to users of this device.

Figure 9:
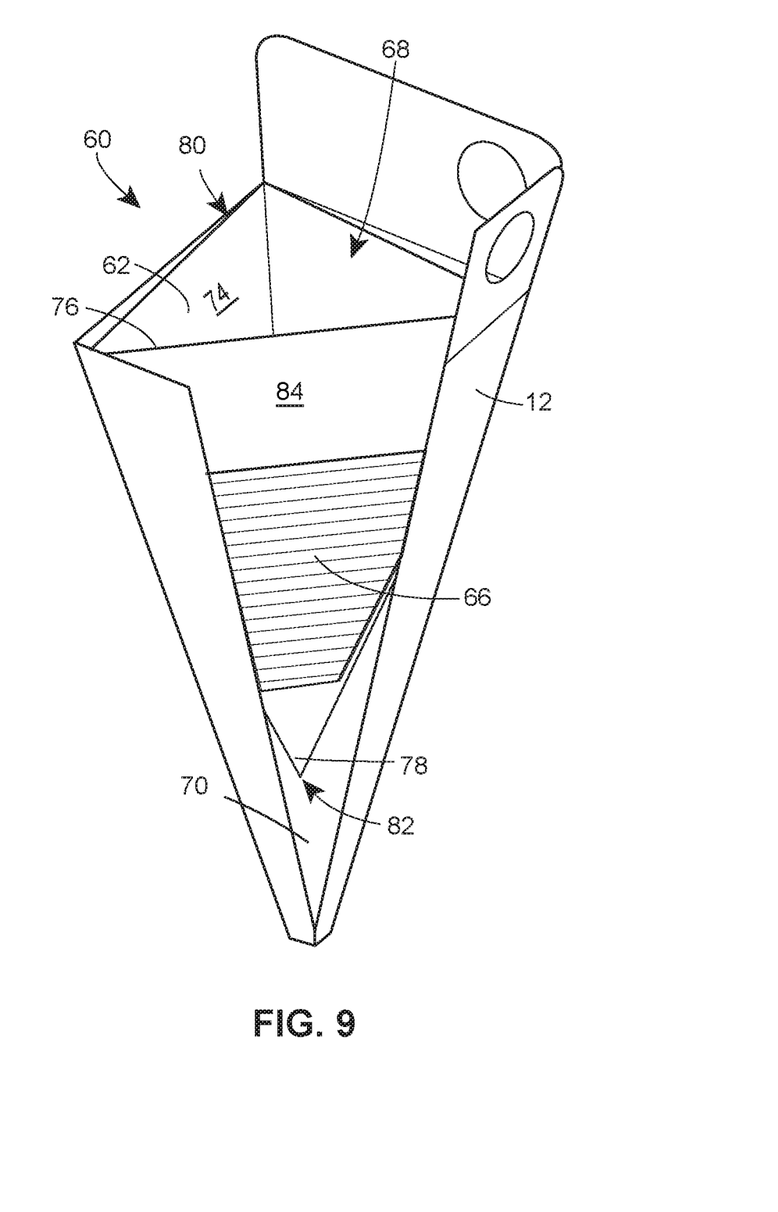
FIG. 9 is an exploded perspective view of an insert for a filtering funnel assembly in accordance with the teachings of the present disclosure.
Figure 10:
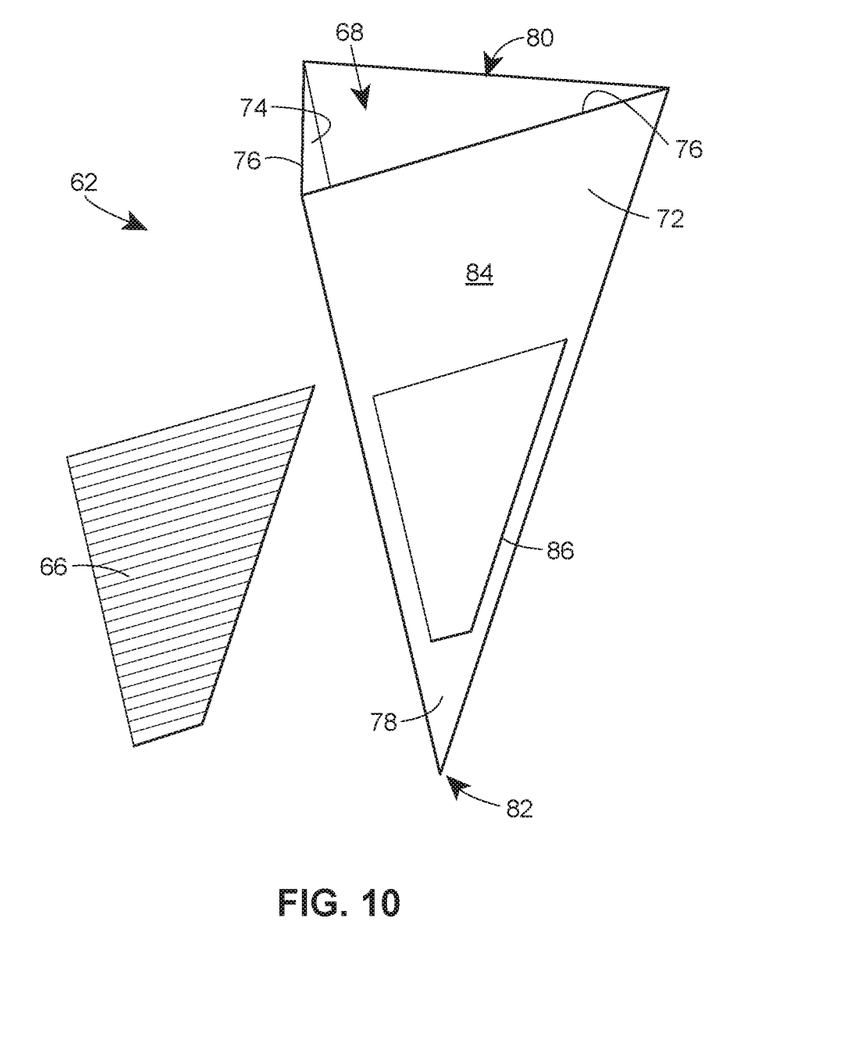
FIG. 10 is an assembled perspective view of the insert of FIG. 9.
Figure 11:
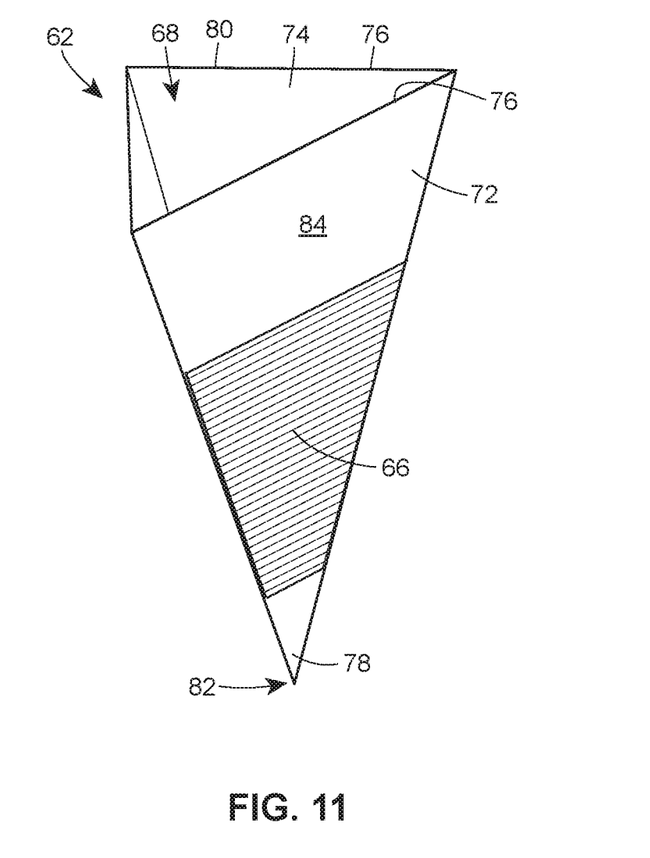
FIG. 11 is a partial perspective view of a second exemplary filtering funnel assembly with the outer body of FIG. 4 and the insert of FIG. 10.

In another embodiment illustrated in FIGS. 9-11, a filtering funnel assembly 60 would include an insert 62 having an interior volume 68 defined by three panels 74 and filtering screen 66. The insert 62 may be disposed within the enclosed funnel of the outer body 12 to divide the outer body 12 into first and second compartments 68, 70. The first compartment 68 is defined by the interior volume of the insert 62 and the second compartment 70 is defined as the volume between the outer body 12 and an exterior surface 72 of the insert 62.

As shown in the figures, the insert 62 is defined by three panels 74 surrounding the interior compartment 68 of the insert 62. Each panel 74 has a top edge 76 and a bottom portion 78, wherein the top edges 76 of the panels 74 define an opening 80 and the bottom portions 78 define a closed end 82. One of the panels 74 is a dividing panel 84 that transverses the inner volume of the enclosed funnel of the outer body 12 and provides a shared wall between the first compartment 68 and a second compartment 70. Best shown in FIG. 10, the dividing panel 84 includes an aperture 86 which fluidly connects the first compartment 68 with the second compartment 70. The filtering screen 66, which may be a polymer mesh, covers the aperture 86 and attaches to an exterior surface 72 of the dividing panel 84, as shown in FIG. 11. The first compartment 68 includes a reservoir located in the end 82 of the insert 62 and below the aperture 86. The size of the reservoir may vary according to the placement of the aperture 86 relative to the end 82.

In operation, fluid may enter the opening 80 of insert 62, which is in fluid communication with the funnel inlet 18 of outer body 12. The reservoir may collect the fluid until the fluid is adjacent to the aperture 86, wherein the fluid may then be filtered through the screen 66 and into the second compartment 70 and exit through the outlet 20. The configuration illustrated in FIG. 9 would allow for the filtration of fluids flowing from the closed first compartment 68, into which fluids are poured and out of the open second compartment 70. As shown in FIGS. 9-11, the insert 62 is separate from the outer body 12 of the filtering funnel assembly 60. In another embodiment, the dividing panel 84 may be a separate layer or may be integrated into the folding pattern of the outer body 12. For example, the dividing panel 84 would be glued at one or more seams matching the seams (or fold lines) of the outer body 12.

One advantage to this embodiment would be the ability to control the level at which filtered fluid is conveyed between compartments. The benefit to this feature is that the filtering funnel assembly 60 can also be used as a water separator. Water in lubricants is deleterious contaminant. Separating water from lubricant is critical for lubrication performance. As water is denser than oil, oil remains on the surface. By controlling (a) the height at which the aperture 86 is located, and (b) the presence of the reservoir in at the bottom of the first compartment 68 in which water, for example, will collect, allows water to be collected without flowing out through the outlet 20 of the filtering funnel assembly 60.

In an alternative embodiment, the filtering funnel assembly 10 may instead be used as a vessel to contain and transport liquids or other mediums, rather than as a filtering funnel. For example, an outer body 12 and a liner 14 would be attached as described above in relation to the filtering funnel assembly 10. The liner 14 would not be a mesh material, but would rather be a homogeneous polymer film. This contiguous polymer pouch would now act as an inner liner or bag, still depending on the outer body 12 for support, but would not allow liquid to pass through. The vessel would be filled and emptied through the upper, larger inlet opening.

In yet another embodiment, the liner may not include panels and may instead be a netting disposed within the funnel of the outer body. The netting includes a perimeter that mates to an interior a perimeter of the inner surface 38 of the outer body 12 such that the netting may be held in place within the funnel. In yet another embodiment, the liner may include one panel, similar to the netting, and may be inserted within the funnel to divide the outer body 12 into first and second compartments wherein the first compartment is defined by the funnel inlet 18 and the insert, and the second compartment is defined by the insert and the funnel outlet 20.

What is claimed:

1. A filtering funnel assembly comprising:
   an outer body having a plurality of panels, a first one of the panels joinable to a second one of the panels to define a funnel;
   each of the plurality of panels including a top edge and a bottom edge, wherein the top edges define a funnel inlet and the bottom edges define a funnel outlet;
   a liner nestable within the funnel, the liner including a plurality of joined side panels, each of the side panels having a top portion and a bottom portion spaced from the top portion, the top portions cooperating to form an upper opening of an interior space in the liner and the bottom portions cooperating to form a closed end; and
   wherein at least one of the plurality of side panels of the liner includes a filter media; and
   wherein an upper portion of the liner directly attaches to the funnel inlet of the outer body.

2. The filtering funnel assembly of claim 1, wherein the liner is shiftable between a collapsed configuration and an expanded configuration, and wherein the opening of the interior space is in communication with the funnel inlet.

3. The filtering funnel assembly of claim 1, wherein the funnel has a first height and the liner has a second height, wherein the first height is greater than the second height.

4. The filtering funnel assembly of a claim 1, wherein the plurality of panels of the outer body are separated by fold lines.

5. The filtering funnel assembly claim 1, wherein a volume of the funnel is larger than a volume of the interior space of the liner.

6. The filtering funnel assembly claim 1, wherein a portion of the liner is attachable to a portion of the outer body.

7. The filtering funnel assembly of claim 1, wherein the top portion of the liner is attachable adjacent to the top edges of the outer body.

8. The filtering funnel assembly of claim 1, wherein the filter media is selected from the group consisting of at least one of: a polymer mesh, a metallic mesh, a nylon mesh, a paper mesh, or a fabric mesh.

9. The filtering funnel assembly of claim 1, wherein a second portion of the liner includes a nonporous material.

10. The filtering funnel assembly of claim 2, wherein a number of panels of the outer body is different than a number of panels of the liner.

11. The filtering funnel assembly of claim 1, further including a gap between the bottom portion of the liner and the funnel outlet.

12. A filtering funnel assembly comprising:
    a funnel-shaped outer body;
    the outer body having a top edge and a bottom edge; and
    a funnel insert nestable within the funnel-shaped outer body, the funnel insert comprising:
    a plurality of panels, a first one of the panels joinable to a second one of the panels to define an interior volume;
    each of the plurality of panels including a top edge and a bottom portion,
    wherein the top edges define an inlet of the interior volume and the bottom portions define an end;
    at least one of the panels of the plurality of panels includes an aperture positioned above the end,
    a first portion disposed within the aperture includes a porous material and a second portion surrounding the aperture includes a nonporous material; and
    wherein the interior volume is configured to allow a fluid to enter the inlet and to pass through the first portion; and
    wherein an upper portion of the funnel insert directly attaches to the top edge of the funnel-shaped outer body.

13. The filtering funnel assembly of claim 12, wherein the porous material is selected from the group consisting of at least one of: a polymer mesh, a metallic mesh, a nylon mesh, a paper mesh, or a fabric mesh.

14. The funnel insert of claim 12, wherein the first portion is disposed at the top edges, and the second portion is disposed at the end.

15. A filtering funnel assembly comprising:
    a funnel-shaped outer body;
    the outer body having a top edge and a bottom edge, wherein the top edge defines a funnel inlet and the bottom edge defines a funnel outlet;
    a liner nestable within the outer body, the liner including a plurality of joined side panels, each of the side panels having a top portion and a bottom portion spaced from the top portion, the top portions cooperating to form an opening adjacent to the funnel inlet and the bottom portions cooperating to form a closed bottom portion spaced away from the funnel outlet by a distance; and
    wherein at least a first portion of the liner includes a filter media; and
    wherein a perimeter of the opening of the liner directly attaches to the outer body at the funnel inlet.

16. The filtering funnel assembly of claim 12, further comprising a reservoir formed between the end of the funnel insert and the aperture of the funnel insert, the reservoir being defined by a non-porous material.

* * * * *

UNITED STATES PATENT AND TRADEMARK OFFICE
CERTIFICATE OF CORRECTION

Page 1 of 1

PATENT NO. : 11,000,788 B2
APPLICATION NO. : 15/557422
DATED : May 11, 2021
INVENTOR(S) : Theodore Salani et al.

It is certified that error appears in the above-identified patent and that said Letters Patent is hereby corrected as shown below:

In the Claims

At Column 7, Line 57, "of a claim" should be -- of claim --.

At Column 7, Line 60, "claim" should be -- of claim --.

At Column 7, Line 63, "claim" should be -- of claim --.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*